(12) United States Patent
Ding et al.

(10) Patent No.: US 9,790,127 B2
(45) Date of Patent: *Oct. 17, 2017

(54) METHOD TO GENERATE HIGH LSG LOW-EMISSIVITY COATING WITH SAME COLOR AFTER HEAT TREATMENT

(71) Applicants: INTERMOLECULAR INC., San Jose, CA (US); GUARDIAN INDUSTRIES CORP., Auburn Hills, MI (US)

(72) Inventors: Guowen Ding, San Jose, CA (US); Jeremy Cheng, Cupertino, CA (US); Tong Ju, Santa Clara, CA (US); Minh Huu Le, San Jose, CA (US); Phil Lingle, Temperance, MI (US); Daniel Schweigert, Fremont, CA (US); Zhi-Wen Wen Sun, Sunnyvale, CA (US); Guizhen Zhang, Santa Clara, CA (US)

(73) Assignees: INTERMOLECULAR, INC., San Jose, CA (US); Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/804,766

(22) Filed: Mar. 14, 2013

(65) Prior Publication Data

US 2014/0272354 A1    Sep. 18, 2014

(51) Int. Cl.
*C03C 17/36* (2006.01)

(52) U.S. Cl.
CPC ............ *C03C 17/366* (2013.01); *C03C 17/36* (2013.01); *C03C 17/3639* (2013.01); *C03C 17/3644* (2013.01); *C03C 17/3652* (2013.01); Y10T 428/24975 (2015.01); Y10T 428/265 (2015.01)

(58) Field of Classification Search
CPC .......................... C03C 17/366; C03C 17/3644
See application file for complete search history.

(56) References Cited

U.S. PATENT DOCUMENTS

| 5,821,001 A * | 10/1998 | Arbab et al. ................. 428/623 |
| 5,948,538 A * | 9/1999 | Brochot ................. C03C 17/36 359/359 |
| 6,045,896 A * | 4/2000 | Boire ...................... C03C 17/36 204/192.23 |
| 6,451,434 B1 * | 9/2002 | Ebisawa ........... B32B 17/10174 428/432 |
| 6,899,953 B1 * | 5/2005 | O'Shaughnessy .. C03C 17/2453 428/336 |

(Continued)

FOREIGN PATENT DOCUMENTS

| CN | 102803174 A | 11/2012 |
| EP | 2 444 381 | 4/2012 |
| WO | WO 2012140098 A1 * | 10/2012 |

*Primary Examiner* — Aaron Austin
*Assistant Examiner* — Zheren J Yang
(74) *Attorney, Agent, or Firm* — Nixon & Vanderhye P.C.

(57) ABSTRACT

Low emissivity panels can include a separation layer of $Zn_2SnO_x$ between multiple infrared reflective stacks. The low emissivity panels can also include $NiNbTiO_x$ as barrier layer. The low emissivity panels have high light to solar gain, color neutral, together with similar observable color before and after a heat treatment process.

11 Claims, 9 Drawing Sheets

(56) References Cited

U.S. PATENT DOCUMENTS

| | | | |
|---|---|---|---|
| 7,056,588 B2 | 6/2006 | Neuman | |
| 7,153,579 B2 | 12/2006 | Kriltz | |
| 7,413,768 B2* | 8/2008 | O'Shaughnessy | 427/162 |
| 7,632,571 B2* | 12/2009 | Hartig | C03C 17/36 428/432 |
| 7,659,002 B2* | 2/2010 | Coster | B32B 17/10036 428/426 |
| 7,745,009 B2 | 6/2010 | Decroupet | |
| 8,003,235 B2 | 8/2011 | Gagliardi | |
| 9,481,603 B2 | 11/2016 | Reymond et al. | |
| 2003/0180547 A1* | 9/2003 | Buhay | B32B 17/10036 428/434 |
| 2004/0229073 A1* | 11/2004 | Dietrich | B32B 17/10174 428/627 |
| 2005/0123772 A1* | 6/2005 | Coustet | C03C 17/36 428/432 |
| 2005/0196622 A1* | 9/2005 | Laird | C03C 17/36 428/432 |
| 2005/0238923 A1* | 10/2005 | Thiel | B32B 17/10 428/701 |
| 2006/0124449 A1* | 6/2006 | Hartig | C03C 17/36 204/192.15 |
| 2006/0280951 A1* | 12/2006 | Fleury | B32B 17/10018 428/432 |
| 2007/0009747 A1* | 1/2007 | Medwick | C03C 17/36 428/432 |
| 2007/0036989 A1* | 2/2007 | Medwick | C03C 17/36 428/432 |
| 2007/0082169 A1* | 4/2007 | Hartig | C03C 17/36 428/69 |
| 2007/0104965 A1* | 5/2007 | Labrousse | B32B 17/10036 428/432 |
| 2007/0212530 A1* | 9/2007 | Berteau | B32B 27/00 428/212 |
| 2007/0242359 A1* | 10/2007 | Thielsch | C03C 17/28 359/585 |
| 2007/0273991 A1* | 11/2007 | List | C03C 17/3423 359/887 |
| 2008/0138547 A1* | 6/2008 | Maschwitz | C03C 17/36 428/34 |
| 2008/0187692 A1* | 8/2008 | Roquiny | C03C 17/36 428/34 |
| 2008/0311389 A1* | 12/2008 | Roquiny | C03C 17/36 428/336 |
| 2009/0047509 A1* | 2/2009 | Gagliardi | C03C 17/36 428/336 |
| 2009/0136765 A1* | 5/2009 | Maschwitz | B32B 17/10036 428/432 |
| 2009/0142602 A1* | 6/2009 | Medwick | C03C 17/36 428/428 |
| 2009/0169846 A1* | 7/2009 | Siddle | C03C 17/36 428/216 |
| 2009/0258222 A1* | 10/2009 | Roquiny | C03C 17/3639 428/336 |
| 2009/0274901 A1* | 11/2009 | Roquiny | C03C 17/36 428/336 |
| 2010/0062245 A1* | 3/2010 | Martin | B32B 17/10174 428/336 |
| 2010/0136365 A1* | 6/2010 | Unquera | C03C 17/36 428/623 |
| 2010/0167034 A1* | 7/2010 | Depauw | C03C 17/36 428/216 |
| 2010/0203239 A1 | 8/2010 | Finley et al. | |
| 2010/0279144 A1 | 11/2010 | Frank | |
| 2011/0020638 A1* | 1/2011 | Di Stefano | C03C 17/36 428/336 |
| 2011/0064967 A1* | 3/2011 | Stachowiak | C03C 17/36 428/623 |
| 2011/0117300 A1 | 5/2011 | Wagner | |
| 2011/0236715 A1* | 9/2011 | Polcyn | C03C 17/36 428/623 |
| 2012/0087005 A1* | 4/2012 | Reymond | C03C 17/36 359/360 |
| 2012/0148863 A1 | 6/2012 | Kleinhempel | |
| 2012/0219821 A1* | 8/2012 | Frank | C03C 17/36 428/630 |
| 2012/0225317 A1* | 9/2012 | Imran | C03C 17/36 428/630 |
| 2013/0094076 A1* | 4/2013 | O'Connor | C03C 17/36 359/360 |
| 2013/0344321 A1* | 12/2013 | McSporran | C03C 17/36 428/336 |
| 2014/0017472 A1* | 1/2014 | Coster | B32B 17/10036 428/219 |
| 2014/0087160 A1* | 3/2014 | McSporran | C03C 17/36 428/216 |
| 2014/0347722 A1* | 11/2014 | Hevesi | C03C 17/3613 359/359 |

* cited by examiner

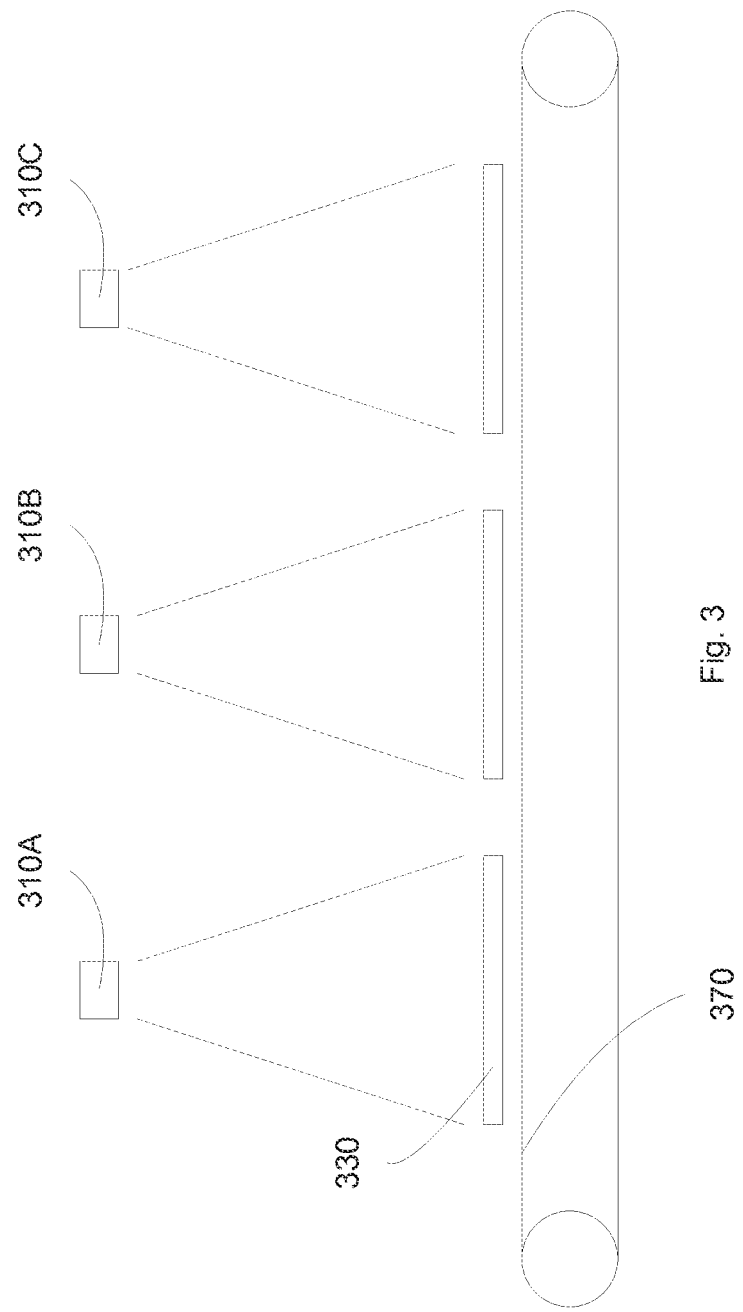

METHOD TO GENERATE HIGH LSG LOW-EMISSIVITY COATING WITH SAME COLOR AFTER HEAT TREATMENT

FIELD OF THE INVENTION

The present invention relates generally to films providing high transmittance and low emissivity, and more particularly to such films deposited on transparent substrates.

BACKGROUND OF THE INVENTION

Sunlight control glasses are commonly used in applications such as building glass windows and vehicle windows, typically offering high visible transmission and low emissivity. High visible transmission can allow more sunlight to pass through the glass windows, thus being desirable in many window applications. Low emissivity can block infrared (IR) radiation to reduce undesirable interior heating.

In low emissivity glasses, IR radiation is mostly reflected with minimum absorption and emission, thus reducing the heat transferring to and from the low emissivity surface. Low emissivity, or low-e, panels are often formed by depositing a reflective layer (e.g., silver) onto a substrate, such as glass. The overall quality of the reflective layer, such as with respect to texturing and crystallographic orientation, is important for achieving the desired performance, such as high visible light transmission and low emissivity (i.e., high heat reflection). In order to provide adhesion, as well as protection, several other layers are typically formed both under and over the reflective layer. The various layers typically include dielectric layers, such as silicon nitride, tin oxide, and zinc oxide, to provide a barrier between the stack and both the substrate and the environment, as well as to act as optical fillers and function as anti-reflective coating layers to improve the optical characteristics of the panel.

Low-emissivity coatings can also be engineered to provide desired shading properties. When sunlight reaches a window, a portion can pass through the window, a portion can be reflected back, and a portion cab be absorbed, which can heat up various parts of the window. A portion of the absorbed heat can flow to the inside of the house, heating up the air in the house. Thus, then sunlight hits a glass window, in addition to lighting the interior, the incident solar radiation can also pass through the window to warm up the house. Solar Heat Gain Coefficient (SHGC) is then defined as the fractional amount of the solar energy that strikes the window that ends up warming the house. Other terms can also be used, such as solar shading property or Light to Solar Gain (LSG), which is used to describe the relationship between lighting and heating from solar irradiation. Light to Solar Gain is defined as the ratio of visible light transmission to solar heat gain coefficient. In the hot weather, it is desirable to have high LSG glass. For example, commercial glass coatings are generally recommended to have LSG greater than 1.8.

There can be a tradeoff between having high visible transmittance and high light to solar gain. Transparent glass can provide high light transmittance but also high solar gain, e.g., low light to solar gain. Dark glass can provide low solar gain, but also low light transmittance. Ag coating low emissivity coating glass can provide significant improvements in terms of both visible light transmittance and light to solar gain properties. However, further improvements in light to solar gain is difficult, for example, low emissivity coatings having thicker Ag layer, or having multiple Ag layers, e.g., double Ag layer or triple Ag layer, can reduce the solar heat gain, but at the expense of lower light transmission.

Another desired characteristic of the glass coatings is color neutral property, e.g., colorless glass. The glass coatings should not exhibit observable hues, e.g., more red or blue than is desired.

Another desired characteristic of the glass coatings temperature matchability, e.g., similar performance and appearance before and after heat treatment. Since glass can be tempered, e.g., involving heating the glass to 600-700° C., the low-emissivity coatings can change significantly during the heat treatment process. To accommodate the tempering changes, low-emissivity coatings can be provided in a temperable version (e.g., heat treated) and a non-temperable version (non heat treated). The film stack of the temperable version can be designed to have properties matching those of the non-temperable version.

It would be desirable to provide low-emissivity coatings that can provide high visible transmittance, high light to solar gain, color neutral, and thermal stability for color and optical performance.

SUMMARY OF THE DISCLOSURE

In some embodiments, methods, and coated panels fabricated from the methods, are disclosed to form multiple coatings, e.g., multiple infrared reflective layers, with minimal color change before and after heat treatments. For example, by adding appropriate separation layers between the infrared reflective layers, the interference between the coatings can be reduced, leading to consistent color reflection regardless of high temperature processes. The separation layers can include a metal oxide layer, together with a Ni—Nb alloy barrier layer for the infrared reflective layers. In addition, metal oxide layers can encapsulate the infrared reflective layers, e.g., forming a base layer under a bottom infrared reflective layer and a protective layer over a top infrared reflective layer, which can further improve the color resistance to thermal exposures.

In some embodiments, the metal oxide layer can include zinc, tin, and oxygen, forming a zinc tin oxide such as $Zn_2SnO_x$, with x less than or equal to about 4. The thickness of the metal oxide layer can be between 50 and 100 nm, e.g., sufficient to reduce any interaction between the top and bottom infrared reflective stacks.

In some embodiments, the Ni—Nb alloy barrier layer can include nickel, niobium, titanium and oxygen, forming a nickel niobium titanium oxide, such as $NiNbTiO_x$, with x between 10 and 30 at %. For example, the $NiNbTiO_x$ layer can be sputtered deposited in a partial oxygen pressure, e.g., in a mixture of oxygen and argon, to control the amount of oxygen content in the oxide barrier layer. The thickness of the Ni—Nb alloy barrier layer can be between 1 and 5 nm, e.g., sufficient to protect the infrared reflective underlayer.

In some embodiments, the metal oxide layer, e.g., $Zn_2SnO_x$, can be used as a base layer for the multiple coatings, e.g., under the first infrared reflective layer, and as a protective layer for the multiple coatings, e.g., on the second infrared reflective layer. The thickness of the base layer or the protective layer can be between 10 and 40 nm.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which:

FIG. 3 illustrates an exemplary in-line deposition system according to some embodiments.

DETAILED DESCRIPTION OF THE DISCLOSURE

Figure 1:
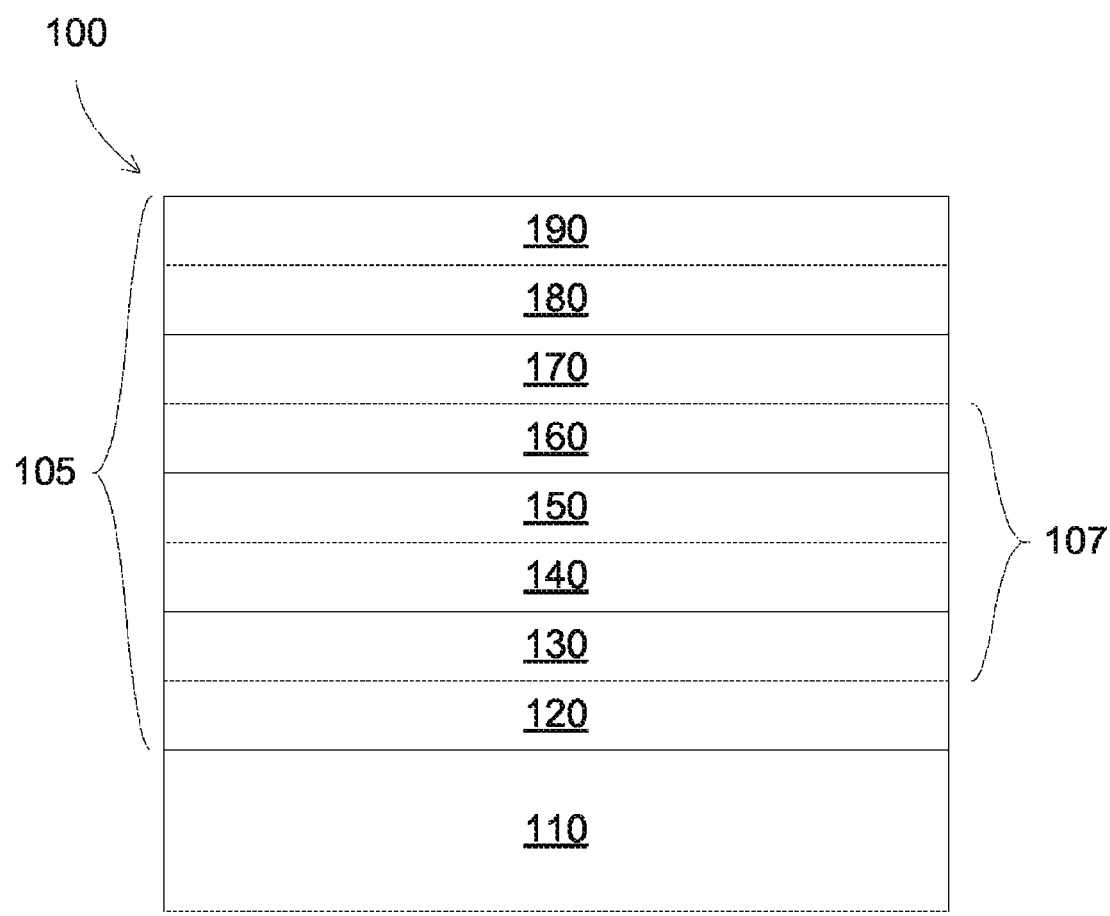
FIG. 1 illustrates a low emissivity transparent panel 100 according to some embodiments.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some embodiments, methods, and coated panels fabricated from the methods, are disclosed to form low emissivity coatings that can provide high visible transmission, high light to solar gain, and minimal color change before and after heat treatments. The low emissivity coatings can include multiple infrared reflective layers to increase the light to solar gain property. The low emissivity coatings can include material and thickness optimization to increase the visible transmission property. Further, the low emissivity coatings can include a separation layer between the multiple infrared reflective layers, for example, to reduce the interference between the coatings, leading to consistent color reflection regardless of high temperature processes.

In some embodiments, the separation layer can include a metal oxide layer, such as a zinc tin oxide of $Zn_2SnO_x$, with x less than or equal to about 4. The thickness of the metal oxide layer can be between 50 and 100 nm, e.g., sufficient to reduce any interaction between the top and bottom infrared reflective stacks without significantly degrading the visible light transmission.

In some embodiments, the low emissivity coatings can include a Ni—Nb alloy barrier layer for the infrared reflective layers. The Ni—Nb alloy barrier layer can include nickel, niobium, and oxygen, together with titanium, aluminum or chromium. For example, the Ni—Nb alloy barrier layer can include a nickel niobium titanium oxide, such as $NiNbTiO_x$, with x between 10 and 30 at %. For example, the $NiNbTiO_x$ layer can be sputtered deposited in a partial oxygen pressure, e.g., in a mixture of oxygen and argon, to control the amount of oxygen content in the oxide barrier layer. The thickness of the Ni—Nb alloy barrier layer can be between 1 and 5 nm, e.g., sufficient to protect the infrared reflective underlayer.

In some embodiments, the low emissivity coatings can include a metal oxide separation layer together with a Ni—Nb alloy barrier layer.

The low emissivity coatings have high visible light transmission and improved light to solar gain (for example, LSG>2), admitting light while blocking the heat associated with sun light. Further, the low emissivity coatings can be thermal resistant, for example, minimal color changes of the glass coatings after a high temperature exposure, for example, $R_g$ $\Delta E<3$ (color change of glass side reflection).

In some embodiments, methods and apparatuses for making coated panels are disclosed. The coated panels can include coated layers formed thereon, such as a low resistivity thin infrared reflective layer having a conductive material such as silver. The infrared reflective layer can include a conductive material, with the percentage of reflectance proportional to the conductivity. Thus a metallic layer, for example silver, can be used as infrared reflective layer in low emissivity coatings. To maintain the conductivity of the infrared reflective layer, e.g., silver layer, for example, against oxidation from deposition of subsequent layers or from subsequent high temperature anneals, a barrier layer can be formed on the silver layer.

In some embodiments, improved coated transparent panels, such as a coated glass, that has acceptable visible light transmission and IR reflection are disclosed. Methods of producing the improved coated transparent panels, which include specific layers in a coating stack, are also disclosed.

The coated transparent panels can include a glass substrate or any other transparent substrates, such as substrates made of organic polymers. The coated transparent panels can be used in window applications such as vehicle and building windows, skylights, or glass doors, either in monolithic glazings or multiple glazings with or without a plastic interlayer or a gas-filled sealed interspace.

FIG. 1 illustrates a low emissivity transparent panel 100 according to some embodiments. The low emissivity transparent panel can include a glass substrate 110 and a low emissivity (low-e) stack 105 formed over the glass substrate 110. The glass substrate 110 in some embodiments is made of a glass, such as borosilicate glass, and has a thickness of, for example, between 1 and 10 millimeters (mm). The substrate 110 may be square or rectangular and about 0.5-2 meters (m) across. In some embodiments, the substrate 110 may be made of, for example, plastic or polycarbonate.

The low-e stack 105 can include a lower protective layer 120, an infrared reflective stack 107, an upper oxide 170, an optical filler layer 180, and an upper protective layer 190. The infrared reflective stack 107 can include a base oxide layer 130, a seed layer 140, a reflective layer 150, and a barrier layer 160. Some layers can be optional, and other layers can be added, such as interface layers or adhesion layers. Exemplary details as to the functionality provided by each of the layers 120-190 are provided below.

The various layers in the low-e stack 105 may be formed sequentially (i.e., from bottom to top) on the glass substrate 110 using a physical vapor deposition (PVD) and/or reactive (or plasma enhanced) sputtering processing tool. For example, the layers can be sputtered deposited using different processes and equipment, for example, the targets can be sputtered under direct current (DC), pulsed DC, alternate current (AC), radio frequency (RF) or any other suitable conditions. In some embodiments, the low-e stack 105 is formed over the entire glass substrate 110. However, in other embodiments, the low-e stack 105 may only be formed on isolated portions of the glass substrate 110.

The lower protective layer 120 is formed on the upper surface of the glass substrate 110. The lower protective layer 120 can include silicon nitride, silicon oxynitride, or other nitride material such as SiZrN, for example, to protect the other layers in the stack 105 from diffusion from the substrate 110 or to improve the haze reduction properties. In some embodiments, the lower protective layer 120 is made of silicon nitride and has a thickness of, for example, between about 10 nm to 50 nm, such as 25 nm.

The base layer 130 is formed on the lower protective layer 120 and over the glass substrate 110. The lower oxide layer is preferably a metal or metal alloy oxide layer and can serve as an antireflective layer. The lower metal oxide layer 130 may enhance the crystallinity of the reflective layer 150, for example, by enhancing the crystallinity of a seed layer 140 for the reflective layer 150, as is described in greater detail below.

The layer 140 can be used to provide a seed layer for the IR reflective layer, for example, a zinc oxide layer deposited before the deposition of a silver reflective layer can provide a silver layer with lower resistivity, which can improve its reflective characteristics. The seed layer 140 can include a metal such as titanium, zirconium, and/or hafnium, or a metal alloy such as zinc oxide, nickel oxide, nickel chrome oxide, nickel alloy oxides, chrome oxides, or chrome alloy oxides.

In some embodiments, the seed layer 140 can be made of a metal, such as titanium, zirconium, and/or hafnium, and has a thickness of, for example, 50 Å or less. Generally, seed layers are relatively thin layers of materials formed on a surface (e.g., a substrate) to promote a particular characteristic of a subsequent layer formed over the surface (e.g., on the seed layer). For example, seed layers may be used to affect the crystalline structure (or crystallographic orientation) of the subsequent layer, which is sometimes referred to as "templating." More particularly, the interaction of the material of the subsequent layer with the crystalline structure of the seed layer causes the crystalline structure of the subsequent layer to be formed in a particular orientation.

For example, a metal seed layer is used to promote growth of the reflective layer in a particular crystallographic orientation. In some embodiments, the metal seed layer is a material with a hexagonal crystal structure and is formed with a (002) crystallographic orientation which promotes growth of the reflective layer in the (111) orientation when the reflective layer has a face centered cubic crystal structure (e.g., silver), which is preferable for low-e panel applications.

In some embodiments, the crystallographic orientation can be characterized by X-ray diffraction (XRD) technique, which is based on observing the scattered intensity of an X-ray beam hitting the layer, e.g., silver layer or seed layer, as a function of the X-ray characteristics, such as the incident and scattered angles. For example, zinc oxide seed layer can show a pronounced (002) peak and higher orders in a $\theta$-$2\theta$ diffraction pattern. This suggests that zinc oxide crystallites with the respective planes oriented parallel to the substrate surface are present.

In some embodiments, the terms "silver layer having (111) crystallographic orientation", or "zinc oxide seed layer having (002) crystallographic orientation" include a meaning that there is a (111) crystallographic orientation for the silver layer or a (002) crystallographic orientation for the zinc oxide seed layer, respectively. The crystallographic orientation can be determined, for example, by observing pronounced crystallography peaks in an XRD characterization.

In some embodiments, the seed layer 140 can be continuous and covers the entire substrate. Alternatively, the seed layer 140 may not be formed in a completely continuous manner. The seed layer can be distributed across the substrate surface such that each of the seed layer areas is laterally spaced apart from the other seed layer areas across the substrate surface and do not completely cover the substrate surface. For example, the thickness of the seed layer 150 can be a monolayer or less, such as between 2.0 and 4.0 Å, and the separation between the layer sections may be the result of forming such a thin seed layer (i.e., such a thin layer may not form a continuous layer).

The reflective layer 150 is formed on the seed layer 140. The IR reflective layer can be a metallic, reflective film, such as silver, gold, or copper. In general, the IR reflective film includes a good electrical conductor, blocking the passage of thermal energy. In some embodiments, the reflective layer 150 is made of silver and has a thickness of, for example, 100 Å. Because the reflective layer 150 is formed on the seed layer 140, for example, due to the (002) crystallographic orientation of the seed layer 140, growth of the silver reflective layer 150 in a (111) crystalline orientation is promoted, which offers low sheet resistance, leading to low panel emissivity.

Because of the promoted (111) textured orientation of the reflective layer 150 caused by the seed layer 140, the conductivity and emissivity of the reflective layer 150 is improved. As a result, a thinner reflective layer 150 may be formed that still provides sufficient reflective properties and visible light transmission. Additionally, the reduced thickness of the reflective layer 150 allows for less material to be used in each panel that is manufactured, thus improving manufacturing throughput and efficiency, increasing the usable life of the target (e.g., silver) used to form the reflective layer 150, and reducing overall manufacturing costs.

Further, the seed layer 140 can provide a barrier between the metal oxide layer 130 and the reflective layer 150 to reduce the likelihood of any reaction of the material of the reflective layer 150 and the oxygen in the lower metal oxide layer 130, especially during subsequent heating processes. As a result, the resistivity of the reflective layer 150 may be reduced, thus increasing performance of the reflective layer 150 by lowering the emissivity.

Formed on the reflective layer 150 is a barrier layer 160. The barrier layer 160 can include nickel, niobium, titanium, aluminum, chromium, and oxygen. For the silver layer to be as pure as possible, the layer immediately on top of the silver layer (e.g., the barrier layer) can be important in protecting the silver from oxidation, such as during oxygen reactive sputtering process in the deposition of subsequent layers. In addition, this barrier layer can protect the silver layer against reaction with oxygen diffusion during the glass tempering process, or during long term use where the piece of glass may be exposed to moisture or environment.

In addition to the oxygen diffusion barrier property, there are other desirable properties for the barrier layer. For example, since the barrier layer is placed directly on the silver layer, low or no solubility of the barrier material in silver is desirable to minimize reactivity between the barrier layer and silver at the interface. The reaction between the barrier layer and silver can introduce impurity to the silver layer, potentially reducing the conductivity.

In some embodiments, barrier structures can be formed on an infrared reflective layer to protect the infrared reflective layer from impurity diffusion, together with exhibiting good adhesion and good optical properties, for example, during the fabrication process.

Formed on the barrier layer 160 is an upper oxide layer 170, which can function as an antireflective film stack, including a single layer or multiple layers for different functional purposes. The antireflective layer 170 can serve to reduce the reflection of visible light, selected based on transmittance, index of refraction, adherence, chemical durability, and thermal stability. In some embodiments, the antireflective layer 170 includes tin oxide, offering high thermal stability properties. The antireflective layer 170 can also include titanium dioxide, silicon nitride, silicon dioxide, silicon oxynitride, niobium oxide, SiZrN, tin oxide, zinc oxide, or any other suitable dielectric material.

The optical filler layer 180 can be used to provide a proper thickness to the low-e stack, for example, to provide an antireflective property. The optical filler layer preferably has high visible light transmittance. In some embodiments, the optical filler layer 180 is made of tin oxide and has a thickness of, for example, 100 Å. The optical filler layer may be used to tune the optical properties of the low-e panel 100. For example, the thickness and refractive index of the optical filler layer may be used to increase the layer thickness to a multiple of the incoming light wavelengths, effectively reducing the light reflectance and improving the light transmittance.

An upper protective layer 190 can be used for protecting the total film stack, for example, to protect the panel from physical or chemical abrasion. The upper protective layer 190 can be an exterior protective layer, such as silicon nitride, silicon oxynitride, titanium oxide, tin oxide, zinc oxide, niobium oxide, or SiZrN.

In some embodiments, adhesion layers can be used to provide adhesion between layers. The adhesion layers can be made of a metal alloy, such as nickel-titanium, and have a thickness of, for example, 30 Å.

Depending on the materials used, some of the layers of the low-e stack 105 may have some elements in common. An example of such a stack may use a zinc-based material in the oxide dielectric layers 130 and 170. As a result, a relatively low number of different targets can be used for the formation of the low-e stack 105.

Further, in the fabrication of low emissivity coating panels, high temperature processes can be used, for example, to anneal the deposited films or to temper the glass substrate. The high temperature processes can have adverse effects on the low emissivity coating, such as changing the structure or the optical properties, e.g., index of refraction n or absorption coefficient k, of the coated films. Thus thermal stability with respect to optical properties is desirable, for example, barrier material might have low extinction coefficient, e.g., low visible absorption, in both metallic form and oxide form.

In some embodiments, the coating can include multiple infrared reflective stacks 107, such as a double or triple infrared reflective stacks with two or three infrared reflective silver layers.

In some embodiments, the effects of the deposition process of the layers deposited on the silver conductive layer on the quality of the silver conductive layer are disclosed. Since the silver conductive layer is desirably thin, for example, less than 20 nm, to provide high visible light transmission, the quality of the silver conductive layer can be affected by the deposition of the subsequently deposited layer, such as the barrier layer or the antireflective layer.

In some embodiments, sputter deposition processes, which can be applied for a barrier layer deposited on a conductive layer are disclosed. For example, the barrier layer can protect the infrared reflective layer from being oxidized. The oxide layer can function as an antireflective layer. The materials of the barrier layer can reduce reaction for the conductive underlayer such as oxidation, preventing resistivity and emissivity degradation.

In some embodiments, the alloy barrier layer can be sputtered from an alloyed target, or co-sputtered from different elemental targets onto the same substrate. The process may include oxygen to make the film oxidized, or may be in pure Ar (which will deposit a metallic barrier layer) followed by an exposure to an oxygen ambient, e.g., during a subsequent metal oxide layer deposition or a subsequent oxidation anneal process.

Figure 2A:
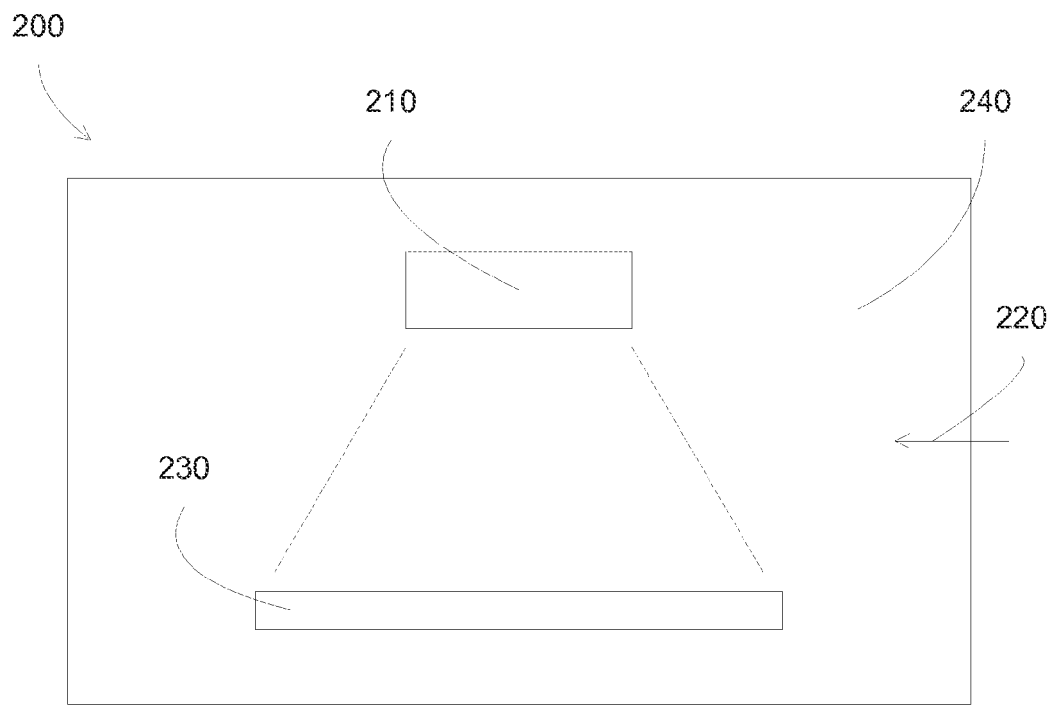
FIGS. 2A-2B illustrate physical vapor deposition (PVD) systems according to some embodiments.
Figure 2B:
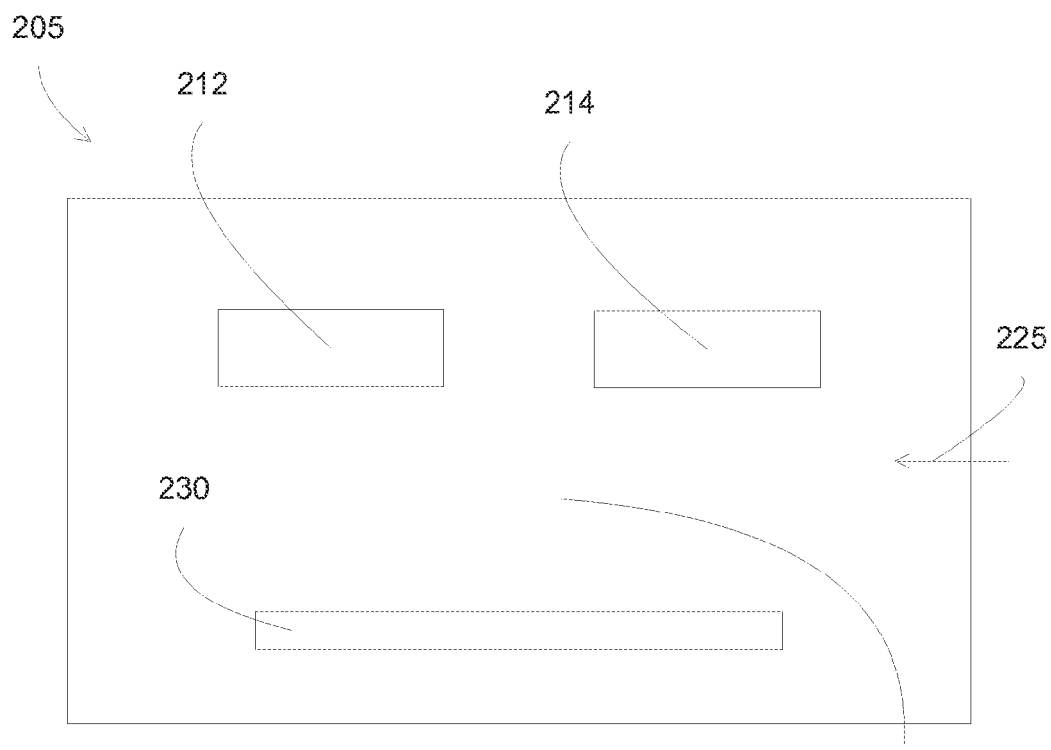

FIGS. 2A-2B illustrate physical vapor deposition (PVD) systems according to some embodiments. In FIG. 2A, a PVD system, also commonly called sputter system or sputter deposition system, 200 includes a housing that defines, or encloses, a processing chamber 240, a substrate 230, a target assembly 210, and reactive species delivered from an outside source 220. During deposition, the target is bombarded with argon ions, which releases sputtered particles toward the substrate 230. The sputter system 200 can perform blanket deposition on the substrate 230, forming a deposited layer that cover the whole substrate, e.g., the area of the substrate that can be reached by the sputtered particles generated from the target assembly 210.

The materials used in the target 210 may, for example, include nickel, niobium and titanium for barrier layer, silver for infrared reflective layer, and other metals for other layers. Additionally, the materials used in the targets may include oxygen, nitrogen, or a combination of oxygen and nitrogen in order to form the oxides, nitrides, and oxynitrides of the metals described above. The different targets can be used to deposit different layers in the low-e coatings, in addition to the barrier layer. Additionally, although only one target assembly 210 is shown, additional target assemblies may be used. As such, different combinations of targets may be used to form, for example, the dielectric layers described above. For example, in some embodiments in which the dielectric material is zinc-tin-oxide, the zinc and the tin may be provided by separate zinc and tin targets, or they may be provided by a single zinc-tin alloy target. A target assembly 210 can include a silver target, and together with argon ions to sputter deposit a silver layer on substrate 230. The target assembly 210 can include a metal or metal alloy target, and together with reactive species of oxygen to sputter deposit a metal alloy oxide layer.

The sputter deposition system 200 can include other components, such as a substrate support for supporting the substrate. The substrate support can include a vacuum chuck, electrostatic chuck, or other known mechanisms. The substrate support can be capable of rotating around an axis thereof that is perpendicular to the surface of the substrate. In addition, the substrate support may move in a vertical direction or in a planar direction. It should be appreciated that the rotation and movement in the vertical direction or planar direction may be achieved through known drive mechanisms which include magnetic drives, linear drives, worm screws, lead screws, a differentially pumped rotary feed through drive, etc.

In some embodiments, the substrate support includes an electrode which is connected to a power supply, for example, to provide a RF or DC bias to the substrate, or to provide a plasma environment in the process housing 240. The target assembly 210 can include an electrode which is connected to a power supply to generate a plasma in the process housing. The target assembly 210 is preferably oriented towards the substrate 230.

The sputter deposition system 200 can also include a power supply coupled to the target electrode. The power supply provides power to the electrodes, causing material to be sputtered from the target. During sputtering, inert gases, such as argon or krypton, may be introduced into the processing chamber 240 through the gas inlet 220. In embodiments in which reactive sputtering is used, reactive gases may also be introduced, such as oxygen and/or nitrogen, which interact with particles ejected from the targets to form oxides, nitrides, and/or oxynitrides on the substrate.

The sputter deposition system 200 can also include a control system (not shown) having, for example, a processor and a memory, which is in operable communication with the other components and configured to control the operation thereof in order to perform the methods described herein.

FIG. 2B shows a sputter system having co-sputtering targets according to some embodiments. A sputter deposition chamber 205 can include two targets 212 and 214 disposed in a plasma environment 245, containing reactive species delivered from an outside source 225. For example, the targets 212 and 214 can include the metal elements of the alloy oxide base layer, e.g., Zn and Sn, together with reactive species of oxygen to deposit an alloy of zinc-tin-oxide base layer on substrate 230. This configuration serves as an example, and other sputter system configurations can be used, such as a single target having an alloy material.

In some embodiments, methods and apparatuses for making low emissivity panels, including forming an infrared reflective layer formed under or over a barrier structure that includes an alloy of titanium aluminum oxide are disclosed. The panels can exhibit optimal infrared reflectance, improved color neutrality, thermal stability and durability, for example, due to the barrier layer protecting the infrared reflective layer while not degrading the low emissivity coating characteristics.

In some embodiments, methods for making low emissivity panels in large area coaters are disclosed. A transport mechanism can be provided to move a substrate under one or more sputter targets, to deposit a conductive layer underlayer before depositing a barrier layer, an antireflective layer, together with other layers such as a surface protection layer.

In some embodiments, in-line deposition systems, including a transport mechanism for moving substrates between deposition stations are disclosed.

FIG. 3 illustrates an exemplary in-line deposition system according to some embodiments. A transport mechanism 370, such as a conveyor belt or a plurality of rollers, can transfer substrate 330 between different sputter deposition stations. For example, the substrate can be positioned at station #1, having a target assembly 310A, then transferred to station #2, having target assembly 310B, and then transferred to station #3, having target assembly 310C. The station #1 having target 310A can be a silver deposition station, sputtering an infrared reflective layer having silver. The station #2 having target 310B can be a barrier deposition station, sputtering a metallic oxide alloy. As shown, the station #2 includes a single target 310B. However, other configurations can be used, such as co-sputtering system utilizing two different targets. The station #3 having target 310C can be used to deposit other layers, such as an antireflective layer or a protection layer.

In some embodiments, methods, and coated panels fabricated from the methods, are disclosed to form multiple coatings, e.g., multiple infrared reflective layers, with minimal color change before and after heat treatments. The methods can include forming a separation layer between two infrared reflective stacks, for example, to prevent interference between the coatings to improve the thermal stability, such as color resistance to thermal exposures. The separation layers can include a metal oxide layer, such as a zinc tin oxide layer.

Figure 4A:
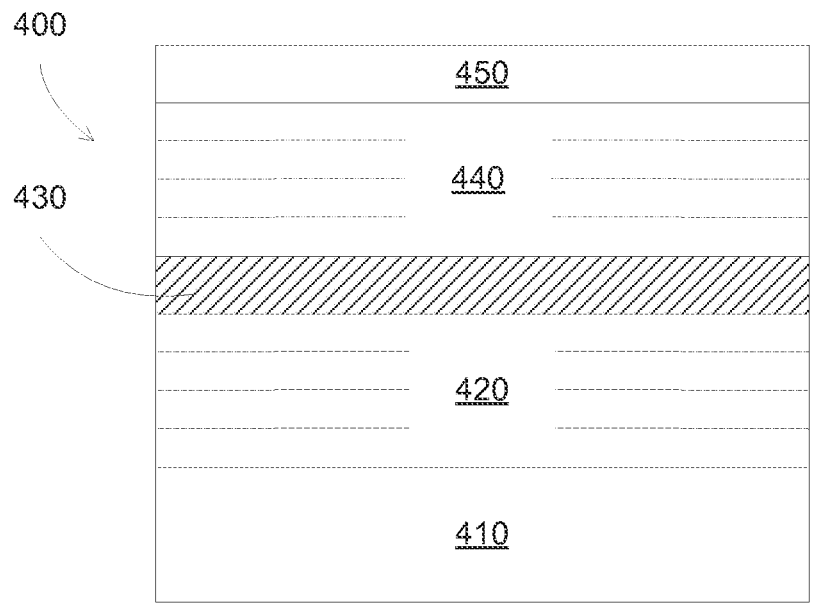
FIGS. 4A-4B illustrate different configurations for forming low emissivity stacks according to some embodiments.
Figure 4B:
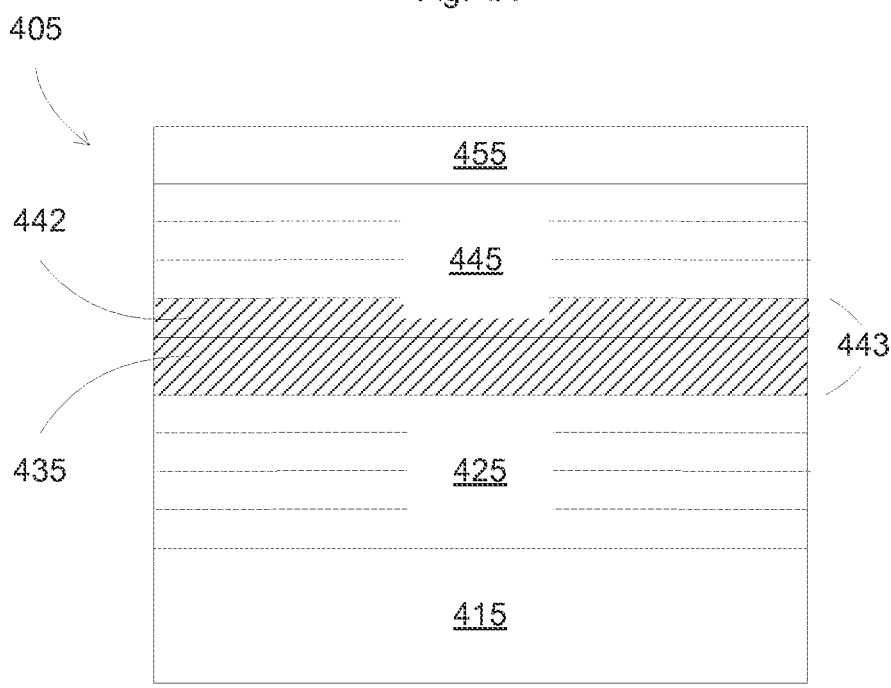

FIGS. 4A-4B illustrate different configurations for forming low emissivity stacks according to some embodiments. In FIG. 4A, a low emissivity stack 400 includes a separation layer 430 acting as a spacer to separate two adjacent infrared reflective stacks 420 and 440, which are formed on a substrate 410. A top protective layer 450 can be included for protecting the coated layers. The infrared reflective stacks 420 and 440 each can include a base layer, a seed layer, a silver layer, and a barrier layer.

In some embodiments, the separation layer can include a zinc tin oxide alloy, such as $Zn_2SnO_x$, with x less than or equal to about 4. The thickness of the separation layer can be between 50 and 100 nm, e.g., sufficient to reduce any interaction between the top and bottom infrared reflective stacks.

In some embodiments, the separation layer can include the material used to form the base layer of the infrared reflective stacks 420 and/or 440. For example, by using a same material for the separation layer 430 and the base layer for the top infrared reflective stack 440, a single layer, with a combined thickness, can form instead of two separated layer of separation layer and base layer.

In FIG. 4B, a low emissivity stack 405 includes a separation layer 435 acting as a spacer to separate two adjacent infrared reflective stacks 425 and 445, which are formed on a substrate 415. A top protective layer 455 can be included for protecting the coated layers. The infrared reflective stacks 425 and 445 each can include a base layer, a seed layer, a silver layer, and a barrier layer. The base layer 442 of the infrared reflective stack 445 can be formed of the same material as the separation layer 430, e.g., $Zn_2SnO_x$, thus can form a thicker base layer 443 for the infrared reflective stack 445. The thickness of the base layer 443 can be the sum of thicknesses of the separation layer 430 and of the base layer 442.

In some embodiments, the low emissivity stack can include two adjacent infrared reflective stacks without any separation layer (e.g., layer 430), as long as the base layer of the top infrared reflective stack is much thicker than a normal base layer, e.g., the base layer of the bottom infrared reflective stack.

In some embodiments, the low emissivity stack can include two adjacent infrared reflective stacks without any separation layer with the base layer of the top infrared reflective stack thicker than the base layer of the bottom infrared reflective stack.

In some embodiments, the metal oxide used for the separation layer, e.g., $Zn_2SnO_x$, can be used as base layers, and the oxide protective layer 450. A low emissivity stack can include a second infrared reflective stack disposed on a first infrared reflective stack. The infrared reflective stacks can include a base layer of $Zn_2SnO_x$, a seed layer such as ZnO, an infrared reflective layer such as silver, and a barrier layer. An oxide protective layer of $Zn_2SnO_x$ can be used on the infrared reflective stacks. The thickness of the base layer and/or the oxide protective layer can be between 10 and 40 nm. Thus each silver layer can be encapsulated at the top and at the bottom by a $Zn_2SnO_x$ layer.

In some embodiments, the low emissivity stack can include Ni—Nb alloy barrier layers for the infrared reflective stacks. For example, the Ni—Nb alloy barrier layers can include nickel niobium oxide, together with an addition element of titanium, aluminum, or chromium. As an example, the barrier layer can include a $NiNbTiO_x$ layer with x between 10 and 30 at %.

In some embodiments, the low emissivity stack can include a metal oxide separation layer, together with a Ni—Nb alloy barrier layer for the infrared reflective stacks, such as the bottom infrared reflective stack. The oxide separation layer and the Ni—Nb alloy barrier can provide improved thermal stability, especially in maintaining similar color of the coated layers before or after a heat treatment process.

Figure 5A:
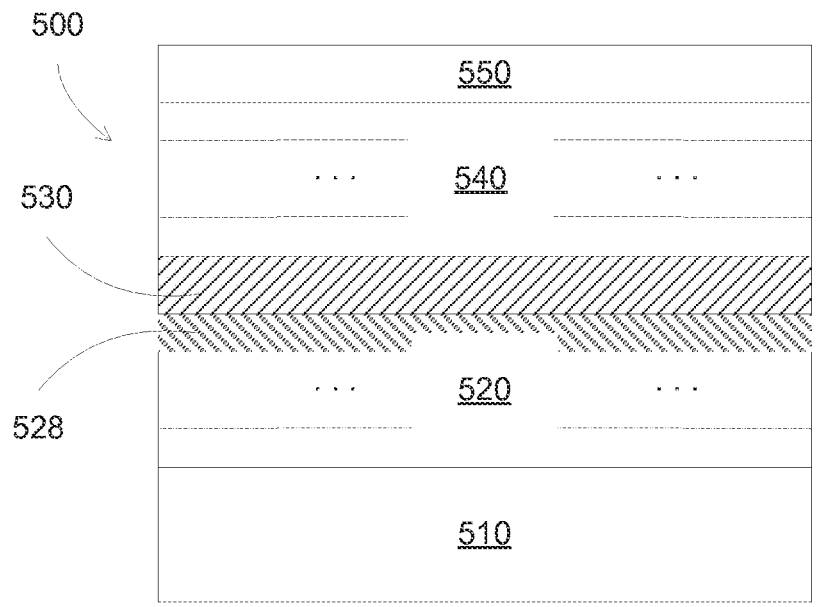
FIGS. 5A-5B illustrate different configurations for forming low emissivity stacks according to some embodiments.
Figure 5B:
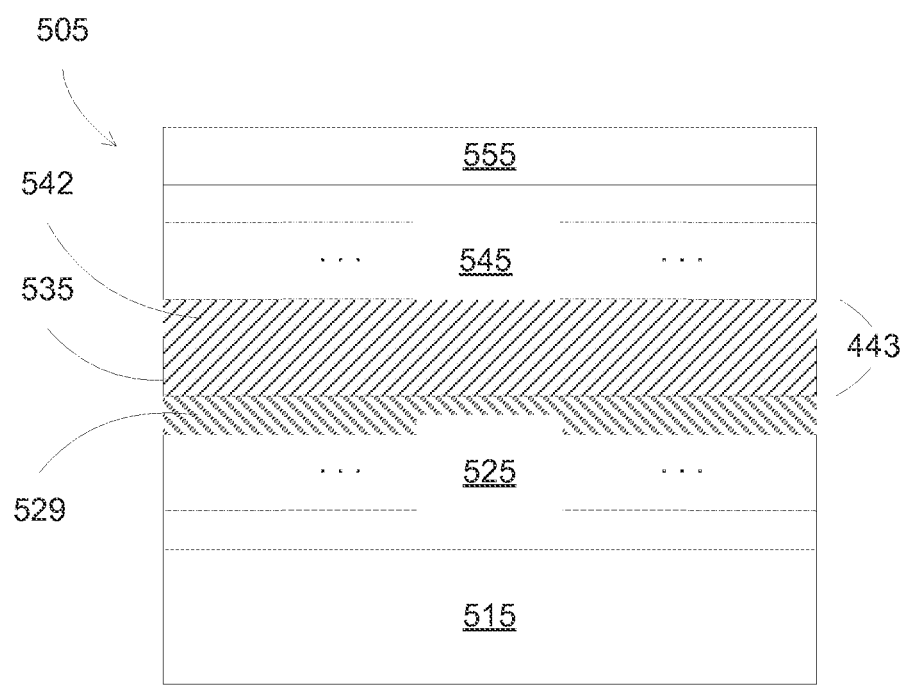

FIGS. 5A-5B illustrate different configurations for forming low emissivity stacks according to some embodiments. In FIG. 5A, a low emissivity stack 500 includes a separation layer 530 acting as a spacer to separate two adjacent infrared reflective stacks 520 and 540, which are formed on a substrate 510. A top protective layer 550 can be included for protecting the coated layers. The infrared reflective stacks 520 and 540 each can include a base layer, a seed layer, a silver layer, and a barrier layer. The barrier layer 528 of the bottom infrared reflective stack 520 can include a Ni—Nb alloy, such as $NiNbTiO_x$, with x between 10 and 30 at %. In some embodiments, the barrier layers for both infrared reflective stacks 520 and 540 both include $NiNbTiO_x$, with x between 10 and 30 at %. The separation layer 530 can include $Zn_2SnO_x$ with x less than about 4. The thickness of the $Zn_2SnO_x$ separation layer 530 can be between 50 and 100 nm. The thickness of the $NiNbTiO_x$ barrier layer 528 can be between 1 and 5 nm. The combination of the separation layer 530 and the $NiNbTiO_x$ barrier layer 528 can improve the thermal stability of the coated layers, in addition to high visible light transmission and high light to solar gain.

In FIG. 5B, a low emissivity stack 505 includes a separation layer 535 acting as a spacer to separate two adjacent infrared reflective stacks 525 and 545, which are formed on a substrate 515. A top protective layer 555 can be included for protecting the coated layers. The infrared reflective stacks 525 and 545 each can include a base layer, a seed layer, a silver layer, and a barrier layer. The base layer 542 of the infrared reflective stack 545 can be formed of the same material as the separation layer 530, e.g., $Zn_2SnO_x$, thus can form a thicker base layer 543 for the infrared reflective stack 545. The thickness of the $Zn_2SnO_x$ separation layer 535 can be between 40 and 90 nm. The thickness of the $Zn_2SnO_x$ base layer 542 can be between 10 and 40 nm. The thickness of the base layer 543 can be the sum of thicknesses of the separation layer 530 and of the base layer 542, such as between 50 and 100 nm. The barrier layer 529 of the bottom infrared reflective stack 525 can include a Ni—Nb alloy, such as $NiNbTiO_x$, with x between 10 and 30 at %. In some embodiments, the barrier layers for both infrared reflective stacks 525 and 545 both include $NiNbTiO_x$, with x between 10 and 30 at %. The thickness of the $NiNbTiO_x$ barrier layer 529 can be between 1 and 5 nm. The combination of the separation layer 535 and the $NiNbTiO_x$ barrier layer 529 can improve the thermal stability of the coated layers, in addition to high visible light transmission and high light to solar gain.

In some embodiments, a low emissivity stack is provided, which can have high visible light transmission, high light to solar gain, color neutral, and highly resistant to thermal cycles. The low emissivity stack can include a layer of lower protection, such as silicon nitride, on a glass substrate. The thickness of the silicon nitride can be between 10 and 30 nm. On the silicon nitride layer is a first infrared reflective stack, including a barrier layer, such as $NiNbTiO_x$, on an infrared reflective layer, such as silver, on a seed layer, such as ZnO, on a base layer, such as $Zn_2SnO_x$. The thickness of the $NiNbTiO_x$ barrier layer can be between 1 and 5 nm. The thickness of the silver layer can be between 8 and 12 nm. The thickness of the ZnO seed layer can be between 3 and 10 nm. The thickness of the $Zn_2SnO_x$ base layer can be between 10 and 40 nm. On the first infrared reflective stack is a second infrared reflective stack, including a barrier layer, such as $NiNbTiO_x$, on an infrared reflective layer, such as silver, on a seed layer, such as ZnO, on a base layer, such as $Zn_2SnO_x$. The thickness of the $NiNbTiO_x$ barrier layer can be between 1 and 5 nm. The thickness of the silver layer can be between 14 and 18 nm. The thickness of the ZnO seed layer can be between 3 and 10 nm. The thickness of the $Zn_2SnO_x$ base layer can be between 50 and 100 nm. The base layer of the second infrared reflective stack can also functioned as a separation layer, separating the first and second infrared reflective stacks. On the second infrared reflective stack is an oxide protective layer, such as $Zn_2SnO_x$. The thickness of the $Zn_2SnO_x$ oxide protective layer can be between 10 and 40 nm. On the oxide protective layer is a stack protective layer, such as silicon nitride. The thickness of the silicon nitride can be between 10 and 30 nm.

Figure 6:
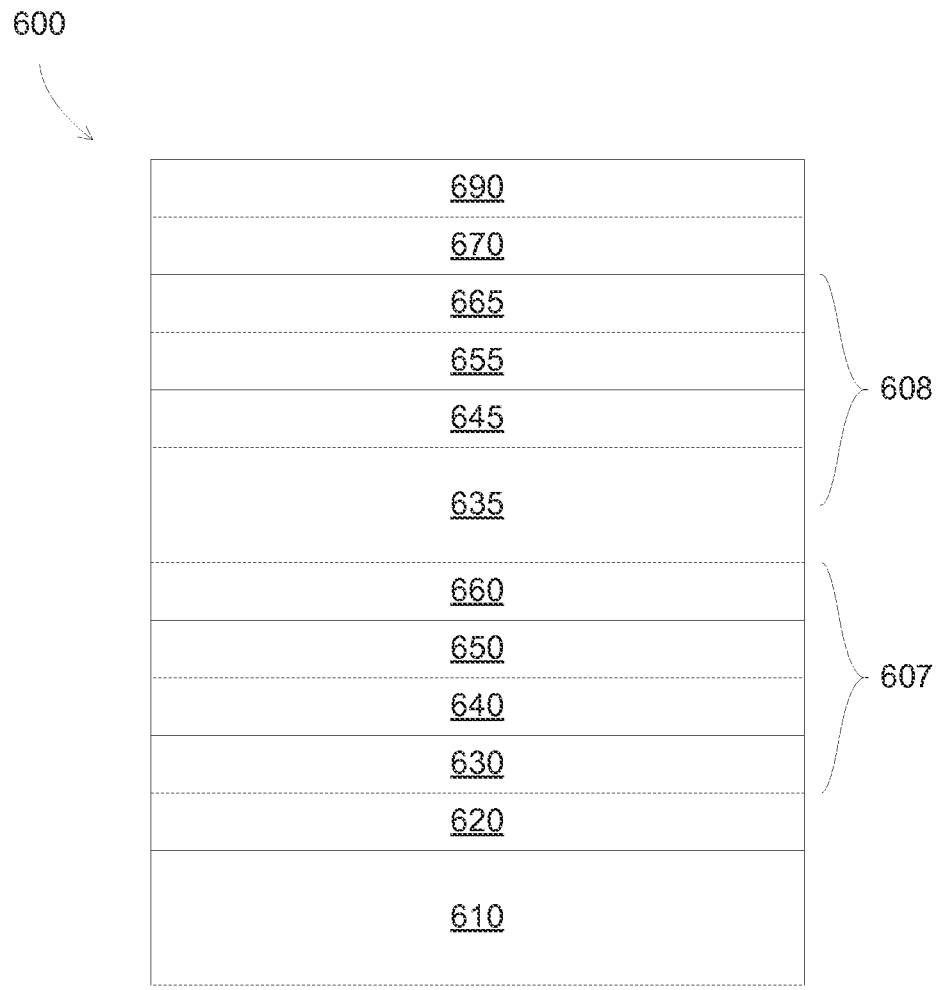
FIG. 6 illustrates a low emissivity stack according to some embodiments.

FIG. 6 illustrates a low emissivity stack according to some embodiments. A low emissivity stack 600 includes a glass substrate 610. A 20 nm silicon nitride layer 620 is formed on the substrate 610. A 20 nm $Zn_2SnO_x$ base layer 630 is formed on the silicon nitride layer. The $Zn_2SnO_x$ base layer 630 has an oxygen concentration of 50 at %. A 5 nm ZnO seed layer 640 is formed on the base layer 630. A 10 nm silver layer 650 is formed on the seed layer 640. A 3 nm $NiNbTiO_x$ barrier layer 660 is formed on the silver layer 650. The $NiNbTiO_x$ barrier layer 660 has an oxygen concentration of 20 at %. The base layer 630, the seed layer 640, the silver layer 650, and the barrier 660 form a first infrared reflective stack 607. An 80 nm $Zn_2SnO_x$ base layer 635 is formed on the barrier layer 660. The $Zn_2SnO_x$ base layer 635 has an oxygen concentration of 50 at %. A 5 nm ZnO seed layer 645 is formed on the base layer 635. A 16 nm silver layer 655 is formed on the seed layer 645. A 3 nm $NiNbTiO_x$ barrier layer 665 is formed on the silver layer 655. The $NiNbTiO_x$ barrier layer 665 has an oxygen concentration of 20 at %. The base layer 635, the seed layer 645, the silver layer 655, and the barrier 665 form a second infrared reflective stack 608. A 20 nm $Zn_2SnO_x$ protective oxide layer 670 is formed on the barrier layer 665. The $Zn_2SnO_x$ protective oxide layer 670 has an oxygen concentration of 50 at %. A 20 nm silicon nitride layer 690 is formed on the protective oxide layer 670. The low emissivity stack was exposed to a heat treatment at 680° C. for 30 minutes.

Figure 7:
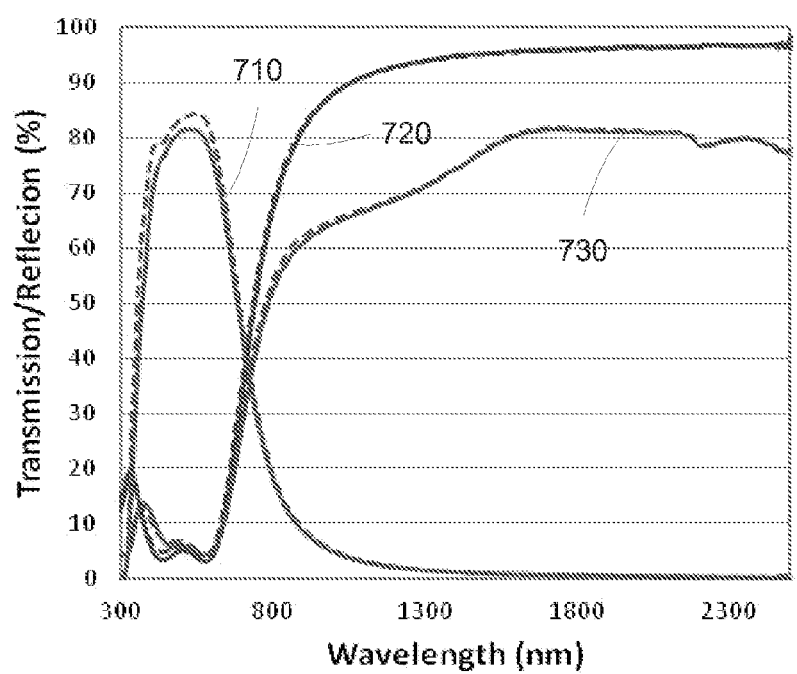
FIG. 7 illustrates the transmission and reflection of the low emissivity stack before and after a high temperature heat treatment according to some embodiments.

Optical can color properties of the low emissivity stack were measured before and after the heat treatment. FIG. 7 illustrates the transmission and reflection of the low emissivity stack before and after a high temperature heat treatment according to some embodiments. The solid and dashed curves 710 show the transmission response through the low emissivity stack. High transmission, e.g., maximum above 80%, can be achieved for the visible light range, e.g., between 400 and 750 nm. The solid and dashed curves 720 show the reflection response from the coating side. Low reflection, e.g., minimum below 5%, can be achieved for the visible light range, e.g., between 400 and 750 nm. High reflection, e.g., maximum above 90%, can be achieved for the infrared range, e.g., between 800 and 2300 nm. The solid and dashed curves 730 show the reflection response from the glass side. Low reflection, e.g., minimum below 5%, can also be achieved for the visible light range, e.g., between 400 and 750 nm. High reflection, e.g., maximum above 80%, can be achieved for the infrared range, e.g., between 800 and 2300 nm.

The solid curves represent the optical spectra for the as-coated low emissivity stack. The dashed curves represent the optical spectra for the high temperature heat treated low emissivity stack. As can be seen, there is minimum difference between the optical spectra of the transmission and reflection of the low emissivity stack before and after a heat treatment.

Other characteristics of the low emissivity stack are shown in the following table. AC represents data for the as-coated low emissivity stack. HT represents data for the low emissivity stack after the high temperature treatment. Data are also shown for monolithic coated stacks, and for insulated glass units (IGU), which show similar performance as for monolithic stacks. Due to the distribution of cones in the eye, the color observance can depend on the observer's field of view. Standard (colorimetric) observer is used, which was taken to be the chromatic response of the average human viewing through a 2° angle, due to the belief that the color-sensitive cones resided within a 2° arc of the fovea. Thus the measurements are shown for the 2° Standard Observer.

Intensity of reflected visible wavelength light, e.g., "reflectance" is defined for glass side "g" or for film side "f". Intensity from glass side reflectance, e.g., $R_g Y$, shows light intensity measured from the side of the glass substrate opposite the side of the coated layers. Intensity from film side reflectance, e.g., $R_f Y$, shows light intensity measured from the side of the glass substrate on which the coated layers are formed. For transmittance, e.g., TY, shows light intensity measured for the transmitted light.

Color characteristics are measured and reported herein using the CIE LAB a*, b* coordinates and scale (i.e. the CIE a*b* diagram, Ill. CIE-C, 2 degree observer). In the CIE LAB color system, L* value indicates the lightness of the color, a* indicates the position between magenta and green (more negative values indicate stronger green and more positive values indicate stronger magenta), and b* indicates the position between yellow and blue (more negative values indicate stronger blue and more positive values indicate stronger yellow).

Emissivity E is a characteristic of both absorption and reflectance of light at given wavelengths. It can usually represented as a complement of the reflectance by the film side, e.g., $E=1-R_f$. For architectural purposes, emissivity values can be important in the far range of the infrared spectrum, i.e. about 2,500-40,000 nm. Thus the emissivity value reported here includes normal emissivity (EN), as measured in the far range of the infrared spectrum. Haze is a percentage of light that deviates from the incident beam greater than 2.5 degrees on the average.

Data are also shown for the difference between heat treated and as-coated low emissivity stacks. The value $\Delta E^*$ (and $\Delta a^*$, $\Delta b^*$, $\Delta Y$) are important in determining whether or not upon heat treatment (HT) there is matchability, or substantial matchability, of the coated panels. For purposes of example, the term $\Delta a^*$, for example, is indicative of how much color value a* changes due to heat treatment. Also, $\Delta E^*$ is indicative of the change in reflectance and/or transmittance (including color appearance) in a coated panel after a heat treatment. $\Delta E^*$ corresponds to the CIELAB Scale L*, a*, b*, and measures color properties before heat treatment ($L_0^*$, $a_0^*$, $b_0^*$) and color properties after heat treatment ($L_1^*$, $a_1^*$, $b_1^*$):

$$\Delta E = \sqrt{(\Delta L^*)^2 + (\Delta a^*)^2 + (\Delta b^*)^2}$$

where:

$$\Delta L^* = L_1^* - L_0^*$$

$$\Delta a^* = a_1^* - a_0^*$$

$$\Delta b^* = b_1^* - b_0^*$$

The color change of glass side reflection can be calculated as $R_g \Delta E^*$. The color change of light transmission can be calculated as $T\Delta E^*$, $T|\Delta a^*|$ and $T|\Delta b^*|$. The luminance change of light transmission can be calculated as $T \Delta Y$.

Thermal performance of the low emissivity stack is also shown, using standard developed by National Fenestration Rating Counsel (NFRC). Visible light transmission $T_{vis}$ is the transmission of wavelengths in the visible spectrum. Solar transmission $T_{sol}$ is the transmission of solar irradiation, including visible light transmittance ($T_{vis}$), infrared radiation transmittance, and ultraviolet radiation transmittance.

U-value, which is synonymous with "thermal transmittance", gives the rate of heat transfer through the window per unit area and per unit temperature difference. The lower the U-value, the lower the amount of heat loss, and the better the heat insulation property of a glass panel. Solar Heat Gain Coefficient (SHGC) is defined as the fractional amount of the solar energy that strikes the window that ends up warming the house. Light to Solar Gain (LSG) is defined as the ratio of visible light transmission to solar heat gain coefficient.

TABLE 1

Measured data for as-coated and heat-treated stacks

| | | | AC | HT |
|---|---|---|---|---|
| Monolithic Optics (Ill 'C', 2 deg obs) | T | Y (%) | 79.1 | 82.2 |
| | | a* | −6.25 | −5.60 |
| | | b* | 0.94 | 1.25 |
| | Rg | Y (%) | 5.51 | 5.91 |
| | | a* | 9.26 | 8.22 |
| | | b* | −4.96 | −4.37 |
| | Rf | Y (%) | 4.67 | 5.46 |
| | | a* | 8.07 | 10.46 |
| | | b* | 3.94 | 1.40 |
| | A[vis] | (100-TT-Rf) | 16.2 | 12.4 |
| IGU Optics (Ill 'C', 2 deg obs) | T | Y (%) | 71.7 | 74.5 |
| | | a* | −6.64 | −5.98 |
| | | b* | 1.05 | 1.32 |
| | Rg | Y (%) | 10.70 | 11.50 |
| | | a* | 3.25 | 2.78 |
| | | b* | −3.09 | −2.53 |
| | Rf | Y (%) | 12.00 | 12.60 |

TABLE 1-continued

Measured data for as-coated and heat-treated stacks

|  |  | AC | HT |
|---|---|---|---|
|  | a* | 3.10 | 4.51 |
|  | b* | 1.22 | 0.24 |
| Normal Emissivity (EN) |  | 0.019 | 0.007 |
| Haze (%) |  | 0.17 | 0.58 |
| HT − AC | Rg ΔE* |  | 1.6 |
|  | T ΔE* |  | 1.5 |
|  | T \|Δb*\| |  | 0.3 |
|  | T ΔY % (HT > AC) |  | 3.1 |
| NFRC 2001 | Tvis (%) | 32 | 33.6 |
| Thermal | Tsol (%) | 71.8 | 74.6 |
| Performance | SHGC(3) | 0.235 | 0.228 |
|  | SHGC(2) | 0.428 | 0.425 |
|  | Uval | 0.345 | 0.36 |
|  | LSG(3) | 1.68 | 1.75 |
|  | LSG(2) | 2.08 | 2.07 |

As can be seen from Table 1, the above low emissivity stack design can show a visible transmittance (TY %) of about 70-80%, a reflectance value (at glass side $R_gY$ or film side $R_fY$) of about 5.5-6.6%, and a desirable color neutral (low values of a* and b*). The above low emissivity stack design can also achieved high LSG value. For example, LSG values greater than 1.8 can be achieved for as-coated and heat-treated stacks, leading to SPS for high LSG products.

Since low-e glass was coated in the double panel, the glass side reflection color can be important (viewers in most applications predominantly view the products from the glass side), together with the transmittance color. The color changes are small, e.g., RΔE*=1.6, TΔE*=1.5, and T|Δb*|=0.3. Such small color change cannot tell by human eyes, so that the above low emissivity stack can be used in single production solution (SPS) for as-coated and heat-treated products. For example, $R_g\Delta E^*$ values smaller than 3 can be achieved for as-coated and heat-treated stacks.

Figure 8:
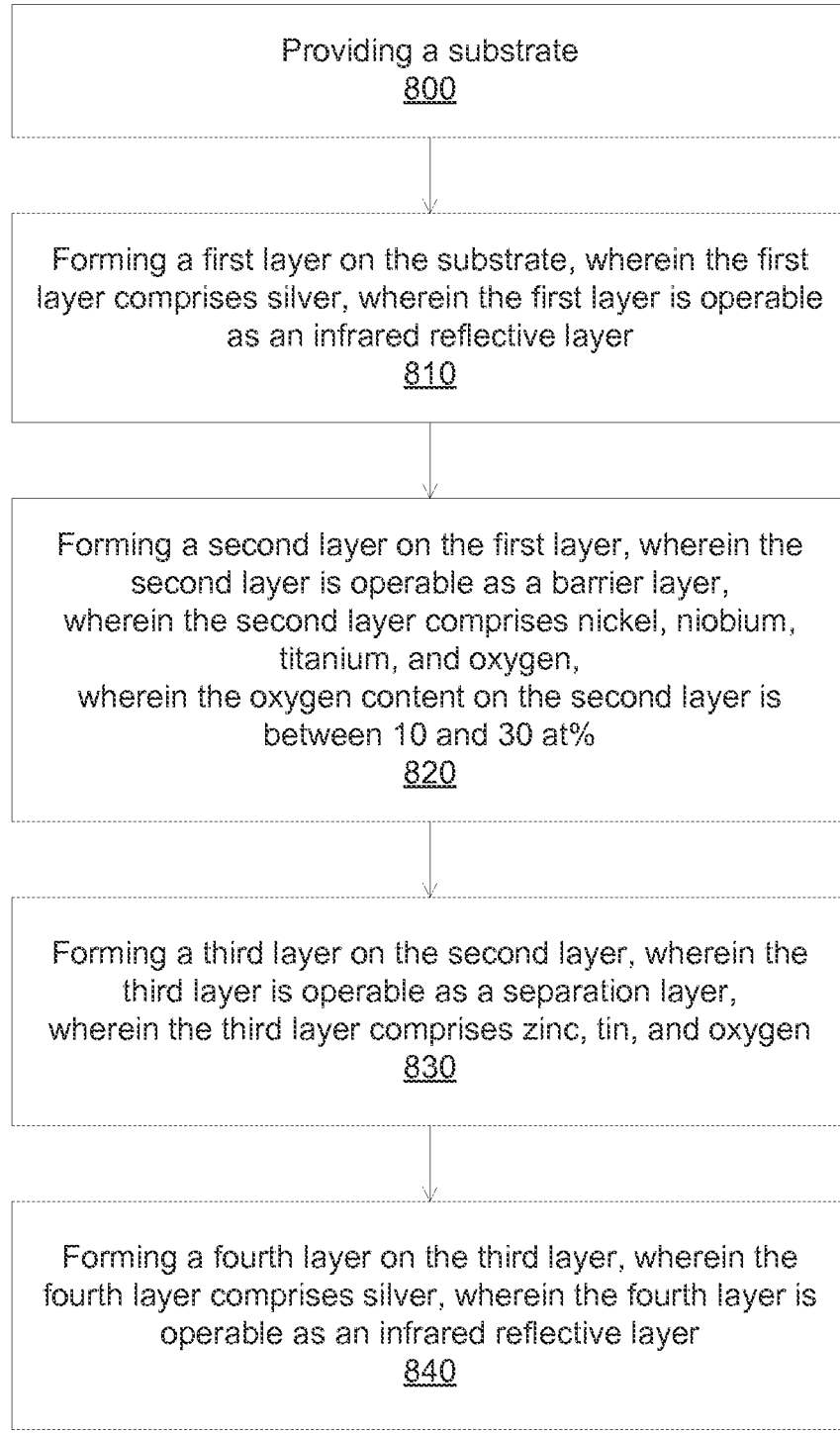
FIG. 8 illustrates a flow chart for sputtering coated layers according to some embodiments.

FIG. 8 illustrates a flow chart for sputtering coated layers according to some embodiments. Two or more infrared reflective silver layers are formed sequentially on a substrate, together with a separation layer between the infrared reflective silver layers. The separation layer can include a zinc tin oxide alloy. In addition, a NiNb alloy can be used as a barrier layer for the silver layers.

In operation 800, a substrate is provided. The substrate can be a transparent substrate, such as a glass substrate or a polymer substrate. Other substrates can also be used. In operation 810, a first layer is formed on the substrate. The first layer can be operable as an infrared reflective layer. The first layer can include a conductive material or a metallic material such as silver. The thickness of the first layer can be less than or equal to about 20 nm, or can be less than or equal to about 10 nm.

In operation 820, a second layer is sputter deposited on the first layer. The second layer can be operable as a barrier layer. The second layer can include an oxide alloy of zinc, tin and titanium. The oxygen content of the barrier layer can be between 10 and 30 at %.

In some embodiments, one or more underlayers can be formed under the first layer, for example, a protection layer of silicon nitride, a base layer of zinc tin oxide, and a seed layer of ZnO.

In operation 830, a third layer is sputter deposited on the second layer. The third second layer can be operable as a separation layer. The third layer can include an oxide alloy of zinc and tin, such as $Zn_2SnO_x$, with x less than 4. The thickness of the separation layer can be between 50 and 100 nm.

In some embodiments, the third layer can be operable as a base layer for the subsequent infrared reflective layer. The thickness of the third layer can be thicker than that of a typical base layer, e.g., 10-40 nm, for example, to operable as a separation layer.

In operation 840, a fourth layer is formed on the third layer. The fourth layer can be operable as an infrared reflective layer. The fourth layer can include a conductive material or a metallic material such as silver. The thickness of the fourth layer can be less than or equal to about 20 nm. The thickness of the fourth layer can be greater than that of the first layer.

In some embodiments, one or more layers can be formed under the fourth layer, for example, a seed layer of ZnO. In some embodiments, one or more layers can be formed on the fourth layer, for example, a barrier layer of $NiNbTiO_x$, with x between 10 and 30 at %, a oxide protection layer of $Zn_2SnO_x$, with x less than 4, and a top protection layer of silicon nitride.

Figure 9:
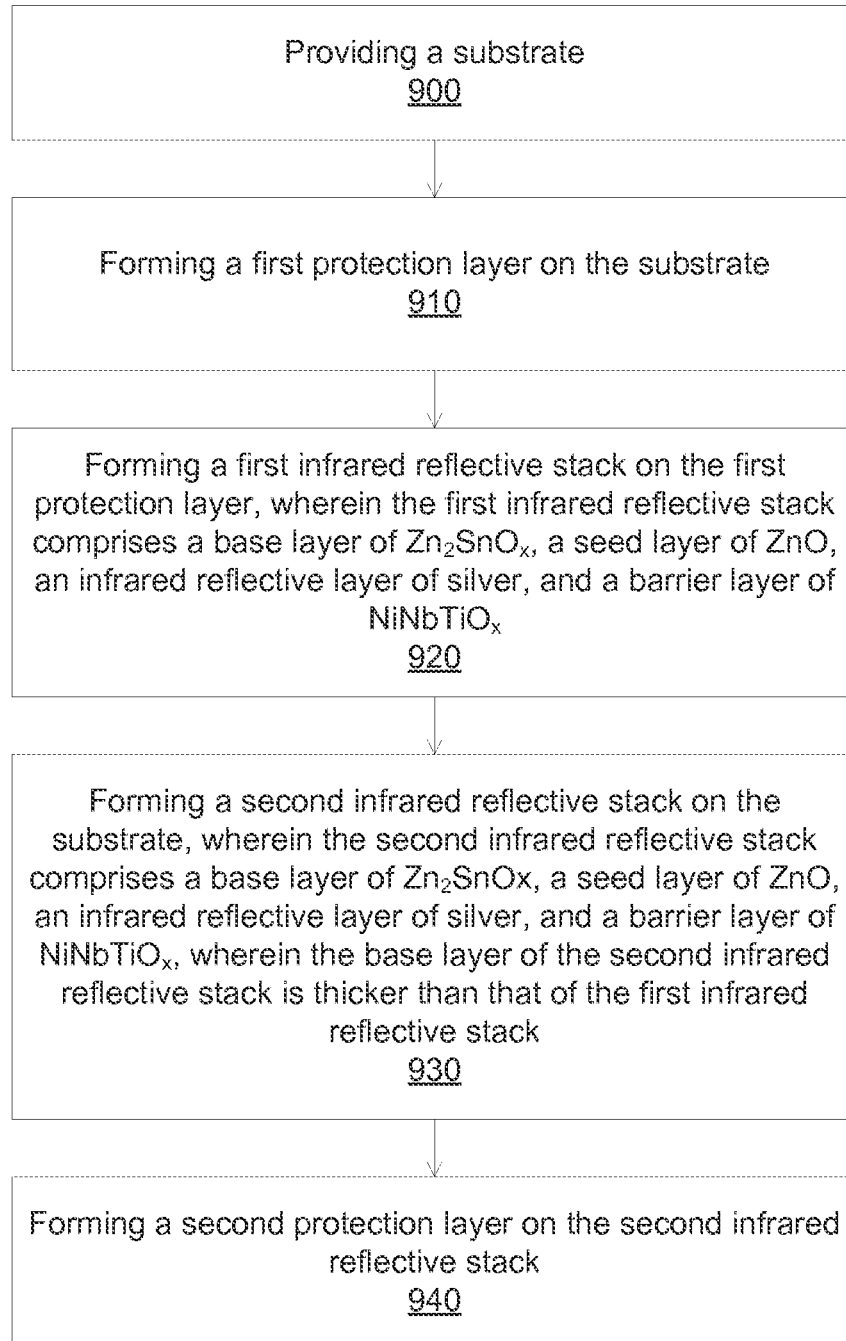
FIG. 9 illustrates a flow chart for sputtering coated layers according to some embodiments.

FIG. 9 illustrates a flow chart for sputtering coated layers according to some embodiments. Two or more infrared reflective stacks are formed sequentially on a substrate, in which a base layer of the top infrared reflective stack is thicker than the base layer of the bottom infrared reflective stack. The base layer can include a zinc tin oxide alloy. In addition, a NiNb alloy can be used as a barrier layer for the silver layers, at least for the bottom infrared reflective stack.

In operation 900, a substrate is provided. The substrate can be a transparent substrate, such as a glass substrate or a polymer substrate. Other substrates can also be used. In operation 910, a first protection layer is formed on the substrate. The first protection layer can include silicon nitride, with a thickness between 10 and 30 nm. In some embodiments, the first protection layer can be optional.

In operation 920, a first infrared reflective stack is formed on the first protection layer. The first infrared reflective stack can include a base layer of $Zn_2SnO_x$, a seed layer of ZnO, an infrared reflective layer of silver, and a barrier layer of $NiNbTiO_x$. The $Zn_2SnO_x$ base layer can have x less than 4, with a thickness between 10 and 40 nm. The ZnO seed layer can have a thickness between 3 and 10 nm. Ag layer can have a thickness between 8 and 12 nm. The $NiNbTiO_x$ barrier layer can have an oxygen content between 10 and 30 at %, with a thickness between 1 and 5 nm.

In operation 930, a second infrared reflective stack is formed on the first infrared reflective stack. The second infrared reflective stack can include a base layer of $Zn_2SnO_x$, a seed layer of ZnO, an infrared reflective layer of silver, and a barrier layer of $NiNbTiO_x$. The $Zn_2SnO_x$ base layer can have x less than 4, with a thickness between 50 and 100 nm. The ZnO seed layer can have a thickness between 3 and 10 nm. Ag layer can have a thickness between 14 and 18 nm. The $NiNbTiO_x$ barrier layer can have an oxygen content between 10 and 30 at %, with a thickness between 1 and 5 nm.

In operation 940, a second protection layer is formed on the second infrared reflective stack. The second protection layer can include a layer of $Zn_2SnO_x$, with x less than 4, and with a thickness between 10 and 40 nm. The second protection layer can include a layer of silicon nitride, with a thickness between 10 and 30 nm.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A coated article including a coating supported by a glass substrate, the coating comprising at least the following layers moving away from the glass substrate:
   a layer comprising zinc, tin, and oxygen having a thickness between 10 nm and 40 nm;
   a seed layer comprising zinc oxide;
   an infrared (IR) reflecting layer comprising silver located on and directly contacting the seed layer comprising zinc oxide,
   a barrier layer located on and directly contacting the first IR reflecting layer, the barrier layer comprising nickel, niobium, titanium and oxygen, wherein the oxygen content of the barrier layer is from 10 to 30 atomic %;
   another layer comprising zinc, tin and oxide over at least the barrier layer;
   another IR reflecting layer comprising silver located over at least the another layer comprising zinc, tin oxide;
   a first layer comprising silicon nitride located over at least the another IR reflecting layer; and
   a layer comprising tin oxide and a second layer comprising silicon nitride located over said first layer comprising silicon nitride, wherein the layer comprising tin oxide is located between and directly contacting the first layer comprising silicon nitride and the second layer comprising silicon nitride, and wherein the second layer comprising silicon nitride is located further from the glass substrate than any of the other recited layers of the coating.

2. The coated article as in claim 1 wherein the light-to-solar gain (LSG) value of the coated article is greater than 1.8.

3. The coated article of claim 1, wherein the coated article is heat treated.

4. A heat treated coated article including a low-E coating supported by a glass substrate, the low-E coating comprising at least the following layers from the glass substrate outwardly:
   a first layer over at least the glass substrate, wherein the first layer comprises zinc tin oxide and has a thickness between 10 nm and 40 nm;
   a second layer formed over the first layer, wherein the second layer comprises zinc oxide and has a thickness between 3 nm and 10 nm;
   a third layer formed over the second layer, wherein the third layer comprises silver and has a thickness between 8 nm and 12 nm;
   a fourth layer formed over the third layer, wherein the fourth layer comprises nickel, niobium, titanium and oxygen and has a thickness between 1 nm and 5 nm, wherein the oxygen content of the fourth layer is from 10 to 30 atomic %;
   a fifth layer formed over the fourth layer, wherein the fifth layer comprises zinc tin oxide in contact with the fourth layer and has a thickness between 50 nm and 100 nm;
   a sixth layer formed over the first through fifth layers, wherein the sixth layer comprises zinc oxide and has a thickness between 3 nm and 10 nm;
   a seventh layer formed above the sixth layer, wherein the seventh layer comprises silver in contact with the sixth layer and has a thickness between 14 nm and 18 nm;
   an eighth layer formed above the seventh layer, wherein the eighth layer comprises nickel, niobium, titanium and oxygen and has a thickness between 1 nm and 5 nm, wherein the oxygen content of the eighth layer is from 10 to 30 atomic %;
   a ninth layer formed above the eighth layer, wherein the ninth layer comprises zinc tin oxide and has a thickness between 10 nm and 40 nm;
   wherein the coated article, measured monolithically, has a visible transmission of at least 80%; and
   wherein the coated article has a glass side reflective AE* value of no greater than 1.6 and a transmissive AE* value of no greater than 1.5 due to the heat treatment which was at at least 580 degrees C.

5. The coated article as in claim 4 wherein the thickness of the first layer is 20 nm, the thickness of the fifth layer is 80 nm, and the thickness of the ninth layer is 20 nm.

6. The coated article as in claim 4 wherein the thickness of the third layer is 10 nm, and the thickness of the seventh layer is 16 nm.

7. The coated article as in claim 4 further comprising:
   a tenth layer formed between the substrate and the first layer, wherein the tenth layer comprises silicon nitride and has a thickness between 10 nm and 30 nm; and
   an eleventh layer formed above the ninth layer, wherein the eleventh layer comprises silicon nitride and has a thickness between 10 nm and 30 nm.

8. A heat treated coated article comprising:
   a substrate;
   a first layer formed directly on the substrate, wherein the first layer comprises silicon nitride and has a thickness of between 10 nm and 30 nm;
   a second layer formed directly on the first layer, wherein the second layer comprises zinc tin oxide and has a thickness between 10 nm and 40 nm;
   a third layer formed directly on the second layer, wherein the third layer comprises zinc oxide and has a thickness between 3 nm and 10 nm;
   a fourth layer formed directly on the third layer, wherein the fourth layer comprises silver and has a thickness between 8 nm and 12 nm;
   a fifth layer formed directly on the fourth layer, wherein the fifth layer comprises nickel niobium titanium oxide and has a thickness between 1 nm and 5 nm, wherein the oxygen content of the fifth layer is from 10 to 30 atomic %;
   a sixth layer formed directly on the fifth layer, wherein the sixth layer comprises zinc tin oxide and has a thickness between 50 nm and 100 nm;
   a seventh layer formed directly on the sixth layer, wherein the seventh layer comprises zinc oxide and has a thickness between 3 nm and 10 nm;
   an eighth layer formed directly on the seventh layer, wherein the eighth layer comprises silver and has a thickness between 14 nm and 18 nm;
   an ninth layer formed directly on the eighth layer, wherein the ninth layer comprises nickel niobium titanium oxide and has a thickness between 1 nm and 5 nm;
   a tenth layer formed directly on the ninth layer, wherein the tenth layer comprises zinc tin oxide and has a thickness between 10 nm and 40 nm;
   an eleventh layer formed directly on the tenth layer, wherein the eleventh layer comprises silicon nitride and has a thickness of between 10 nm and 30 nm;
   wherein the coated article, measured monolithically, has a visible transmission of at least 80%; and
   wherein the coated article has a glass side reflective AE* value of no greater than 1.6 and a transmissive AE* value of no greater than 1.5 due to the heat treatment which was at at least 580 degrees C.

9. The coated article as in claim 8 wherein the second layer has a thickness of 20 nm, the sixth layer has a thickness of 80 nm, and the tenth layer has a thickness of 20 nm.

10. The coated article as in claim 8 wherein each of the third layer and the seventh layer has a thickness of 5 nm, each of the fifth layer and the ninth layer has a thickness of 3 nm, and each of the first layer and the eleventh layer has a thickness of 20 nm.

11. The coated article as in claim 8 wherein the fourth layer has a thickness of 10 nm and the eighth layer has a thickness of 16 nm.

* * * * *